3,383,919
LAMINAR FLOW TEMPERATURE PROBE
Robert D. Marcy, Sepulveda, Richard F. Searle, Santa Susana, and John Perow, Thousand Oaks, Calif., assignors to North American Rockwell Corporation, a corporation of Delaware
Filed June 23, 1966, Ser. No. 559,956
5 Claims. (Cl. 73—357)

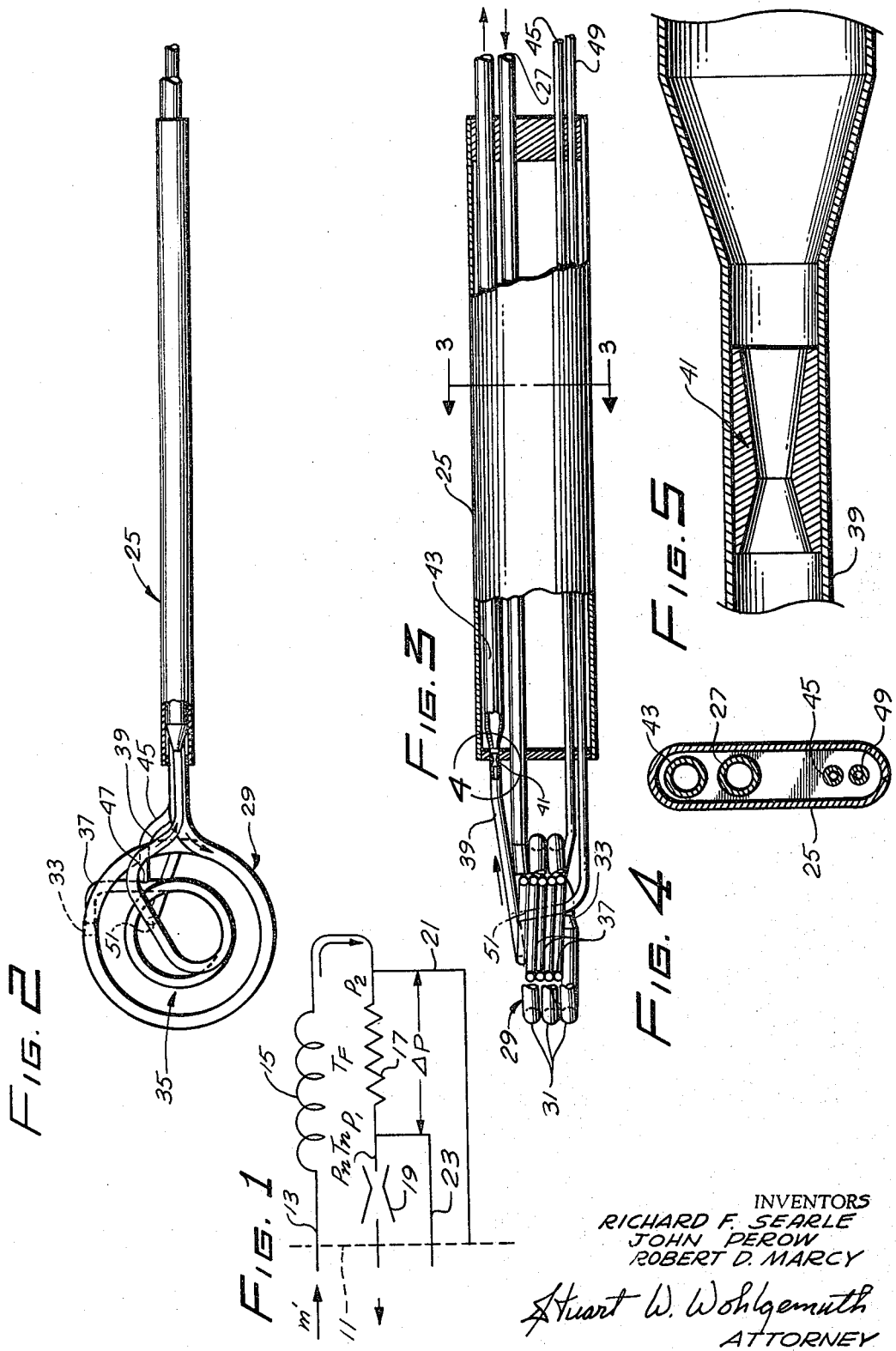

This invention relates to a temperature sensor. More particularly, the invention relates to a laminar flow temperature sensor device.

Recent developments in control systems emphasize all pneumatic ones which are generally referred to as pure fluid systems. These type of systems operate reliably at elevated temperatures in excess of 4000° R. and in nuclear radiation environments which posed severe problems for prior electronic systems. An accurate, reliable temperature sensor is needed to meet the requirements of power control fluid loops and/or for use in other high temperature environment operations.

There are various temperature sensing methods that have been previously developed, which include immersion, thermal radiation, sonic and pneumatic techniques. Immersion devices which depend upon changes in electrical properties are not suitable for the applications concerned in this invention because of material electrical instability and breakdown after several minutes, for example, in a hydrogen environment at temperatures on the order of 4500° R. High level nuclear radiation effects, independent of temperature effects, also introduce transient and long term change in performance. Methods of measuring temperature by a total thermal radiation and/or the velocity of sound have not been developed to a point where they would be compatible since they do not provide a desired pneumatic output signal to be used with the fluid control systems. They also are electronic in nature and suffer from radiation damage effects. Thus, this invention is particularly directed to a form of temperature sensing known as pneumatic control or pneumatic probes because their output signal is one which can be used directly in a pneumatic control system.

An object of this invention is to provide a temperature sensor with a simple design having no moving parts.

Another object of this invention is to provide an all pneumatic temperature sensor having an all pneumatic output suitable for control.

One further object of this invention is to provide a temperature sensor having relatively linear output with essentially constant sensitivity.

Another object of this invention is to provide a temperature sensor having a wide temperature range of greater than 500° R. to 5000° R.

The above and other objects of the invention are accomplished by the laminar flow temperature sensor of this invention. The laminar flow temperature sensor consists of three basic elements; namely a heat exchanger, a laminar flow tube, and a sonic nozzle. In the utilization of the device, all three elements which are in one integral unit are in thermal contact with a surrounding media at an unknown temperature. The surrounding media may be a solid, liquid or gas whose temperature is to be measured. A working gas at constant pressure is then flowed through the heat exchanger where its temperature is raised to the unknown temperature of the surrounding media. The working gas subsequently passes through the laminar flow tube and then through the sonic nozzle which are also at the same temperature. By virtue of the laminar flow and the sonic nozzle flow characteristics, the pressure drop in the laminar flow section is a single valued function of the unknown temperature. The pressure drop will vary approximately with the temperature to the 1.16 power. The device can be made relatively insensitive to supply pressure variations by keeping the pressure drop in the laminar flow section small relative to the operating pressure. It is believed that the invention will be better understood from the following drawings and detailed description:

FIG. 1 is a schematic line representation of the temperature sensor system.

FIG. 2 is a partially-sectioned pictorial representation of a top view of the temperature sensor.

FIG. 3 is a partially-sectioned pictorial side view of the sensor of FIG. 2.

FIG. 4 is a cross-section taken along line 4—4 of FIG. 3.

FIG. 5 is an enlarged sectioned view of the sonic nozzle portion of the temperature sensor taken from FIG. 2.

Referring now to FIG. 1 where a schematic representation of the device of the invention is shown, a dotted line 11 represents the barrier between the ambient condition in the hot environment in which the main portion of the device is inserted. The working gas enters through inlet line 13 and passes through a heat exchanger section 15. The purpose of the heat exchanger section is to bring the working gas to the temperature of the environment. After the temperature of the working gas has been so raised to the environmental temperature, the gas then passes through a laminar flow section 17. After completion of the flow through the laminar flow section, the gas passes through a sonic nozzle 19 and eventually exits from the device. Pressure tap line 21 takes the pressure of the working gas prior to its entering the laminar flow region 17. A second pressure tap takes the pressure of the gas after the laminar flow section prior to entering the sonic nozzle 19. The operation of the sensor is based both on a theoretical analysis and experimental results. The fundamental performance characteristics are defined by the following equations:

(1) Laminar flow pressure drop equation for circular tubes:

$$\Delta P = 128 \mu L Z \dot{m} R T / \pi D^4 g P$$

(2) Sonic nozzle equation in simplified form:

$$\dot{m} = K_n P / \sqrt{T}$$

(3) Operating gas viscosity relation:

$$\mu = f(T, P) \simeq K_\mu T^{0.66}$$

where, $\Delta P$ = pressure drop in laminar flow section (p.s.i.a.)
$\mu$ = viscosity of operating gas in laminar flow section (lb.$_m$/in.-sec.)
$L$ = length of laminar flow section in ft.
$Z$ = gas compressibility factor.
$R$ = gas constant
$T$ = temperature of operating gas (° R.)
$D$ = diameter of laminar flow tube (in.)
$g$ = gravitational constant.
$P$ = operating gas pressure (p.s.i.)
$\dot{m}$ = operating gas flow rate (lb.$_m$/sec.)
$K_n$ = constant in sonic nozzle equation which is determined by the type of gas and geometry
$K_\mu$ = a constant determined by the type of gas and pressure range
$f(\ )$ = means function of variables in bracket
$\simeq$ = means approximately equal to Consistent dimensional units must apply to all parameters.

Equation 1 is derived from standard pressure drop relations for circular ducts, laminar flow friction factor correlations, and the perfect gas law. Equation 2 is a simplification of the adiabatic nozzle flow equation in which parameters which do not significantly vary for the system being considered have been incorporated in the equation constant. Viscosity of the selected operating gas is a function of temperature and pressure. It can be shown, by use of well established physical property tables, that gas viscosity is almost exclusively determined by temperature. Thus, the right hand term of Equation 3 can be used to approximate gas viscosity to a relatively good degree of accuracy.

These equations may be combined to produce a single value relation between temperature and laminar flow section pressure drop:

$$(4) \quad \Delta P = \frac{128 K_\mu K L_n Z R}{\pi D^4 g} T^{1.16} \simeq K T^{1.16}$$

where the constant K is the product of all the constant factors in the equation. The determination of the size and length of the laminar flow section is standard chemical engineering practice involving the use of a Reynolds number and standard friction factor correlations. With knowledge of the working gas flow rate and the approximate temperature range achieved in the environment in which the device will be used so that the viscosity of the working gas will be known, the diameter of the laminar flow tube section can be determined so that the Reynolds number is within the range where laminar flow is achieved. After the diameter of the laminar flow tube is determined, the length of the section will be chosen depending upon the approximate desired pressure drop across the section, since the pressure drop is proportional to the length of the tube. As indicated, the foregoing is standard chemical engineering practice and is within the skill of the art.

Referring now to FIGS. 2 and 3 wherein the configuration of the device of the invention is shown, there can be seen an outer housing 25 which serves to support in the case the various feed and return lines to the main portion of the temperature sensor. The working gas enters through a supply line 27 and passes through heat exchange section 29 of the sensor. The heat exchange section as shown in the drawing is shown as comprised of three successive loops 31 of tubing of the same diameter as the supply line 27. After the third loop a fitting 33 connects the heat exchange section to the laminar flow section 35. The laminar flow section is comprised of smaller tubing 37. The laminar flow region which is comprised of substantially smaller tubing than the heat exchange section forms a plurality of successive loops 38 concentrically within the heat exchange section of the sensor. The gas leaves the laminar flow region through an exit line 39 and passes to a sonic nozzle 41 at approximately the entrance to the outer enclosure 25. Just downstream from the sonic nozzle, the exit line 43 enlarges back to the same diameter as the supply line 27 and in the heat exchange section of the sensor. A first pressure sensing line 45 passes through and intersects the laminar flow region just prior to the first loop thereof at 47 as particularly seen in FIG. 2. A second pressure sensing line 49 passes through the housing and intersects the laminar flow region near the end of the last loop at 51. Thus, the pressure sensing lines 45 and 49, as additionally shown in FIG. 4, respectively, are able to sense the pressure at the beginning and completion of the flow of the working gas through the laminar region. Both of the pressure sensing lines are of the same diameter as the tubing in the laminar flow region.

Turning now to FIG. 5 there is shown an enlarged section of line 39 containing the sonic nozzle 41. The sonic nozzle can be fabricated of material such as brass or tungsten and the like for easy manufacturing and high tolerances required for placement of it within the line 39. This nozzle is generally preferable to a thin plate orifice in that a coefficient of discharge is more nearly constant with variations in flow. However, restriction by means of a thin plate orifice can satisfactorily accomplish the desired end result. In the operation of the device, the supply gas can be any gas which approximates a perfect gas in the temperature and pressure range of interest. Hydrogen or helium usually qualify for this application.

In a laboratory scale apparatus the supply gas was passed through a precooling section, a dryer, and a filter before entering the sensor. This was to ensure that only clean, dry gas arrives at the sensor so as to preclude icing in the laminar flow section in the sonic nozzle during testing at cold temperatures. Any conventional dryer can be used. In performing tests with the sensor of the invention, the dryer was composed of a 12 inch section of 1¼ inch tubing packed with glass wool. Stainless steel tubing can be used in the heat exchange section. An example of the size of tubing that is used in a specific test was ⅛ inch tubing. The laminar flow section of the specific device tested was fabricated of a 10 inch length of 304 surgical stainless steel capillary tubing. In the testing of the device, thermocouples were installed upstream and downstream of the laminar flow section to ensure that there were no temperature variations in the section. The supply pressure was measured upstream of the heat exchanger section and the differential pressure across the laminar flow section was precisely measured with a water monometer reading off of the pressure sensing lines 45 and 49. The gas flow from the sonic nozzle was collected and measured with a rotometer. The gas temperature was brought to ambient in the exhaust tubing outside the environmental chamber in a water bath so as to minimize corrections to the indicated flow readings.

As can be seen, the herein invention is based upon the principle that the pressure drop of the laminar section will vary solely as a function of the temperature of the environment due to the presence of the sonic nozzle at the end of the laminar flow section. In order to effect this principle of operation it should be appreciated that the specific design configuration shown in the figures is by way of illustration only. In order for a design to successfully function in accord with the above stated principle, there must be present the aforementioned three major components; namely, a heat exchanger, a laminar flow section, and a sonic nozzle through which the working gas may pass. The changes in tubing diameter, for example, as shown in the figure, are peculiar only to that device depicted. For example, the same size diameter tubing can be used throughout the whole device. Additionally, the coiled configuration of the heat exchanger and laminar flow section as shown is but for convenience only. It need not be present in a device as contemplated.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An apparatus for sensing temperature in an environment comprising:
    inlet means for admitting a working gas to said apparatus,
    a heat exchanger connected to said inlet means, whereby said working gas passing through said heat exchanger reaches the temperature of said environment,
    a laminar flow tube affixed to an outlet of said heat exchanger whereby said working gas leaving said heat exchanger will establish laminar flow,
    a sonic nozzle,
    means for conducting said working gas from said laminar flow section to said sonic nozzle,
    means for conducting said gas from the outlet of said nozzle, and pressure taps disposed at both ends of said laminar flow section, whereby pressure sensing means can determine the pressure of said working gas before and after it passes through said laminar flow section.

2. The apparatus of claim 1 wherein said inlet means, heat exchanger, laminar flow tube, means for conducting said working gas from said laminar flow section to said sonic nozzle and said outlet means are comprised of continuous tubing.

3. The apparatus of claim 2 wherein said tubing varies in diameter according to function performed by a particular section thereof.

4. A method determining temperature of an environment comprising:
  passing a working gas through a heat exchanger disposed in said environment raising said gas to the temperature of said environment,
  directing said gas from said heat exchanger through a laminar flow tube disposed in said environment,
  passing said gas through a sonic nozzle after said gas establishes laminar flow,
  obtaining the pressure differential across said laminar flow tube whereby said pressure differential is used to determine the temperature in said environment.

5. The method of claim 4 wherein said temperature determination is made utilizing the formula:

$$\Delta P = [128 K_\mu K_n L Z R / \pi D^4 g] T^{1.16}$$

where,
  $\Delta P$ = pressure drop in laminar flow section (p.s.i.a.)
  $K_\mu$ = a constant determined by the type of gas and pressure range
  $K_n$ = constant in sonic nozzle equation which is determined by the type of gas and geometry
  $L$ = length of laminar flow section in feet
  $Z$ = gas compressibility factor
  $R$ = gas constant
  $D$ = diameter of laminar flow tube (in.)
  $g$ = gravitational constant
  $T$ = temperature of operation gas (° R)

References Cited
UNITED STATES PATENTS

| 2,549,621 | 4/1951 | Moore   | 73—357 |
| 2,549,624 | 4/1951 | Moore   | 73—357 |
| 2,549,625 | 4/1951 | Moore   | 73—357 |
| 3,314,294 | 4/1967 | Colston | 73—357 |

LOUIS R. PRINCE, *Primary Examiner.*

NEIL B. SIEGEL, *Examiner.*